(12) United States Patent
Graves et al.

(10) Patent No.: US 8,787,529 B2
(45) Date of Patent: Jul. 22, 2014

(54) COMPACT COHERENT CURRENT AND RADIATION SOURCE

(75) Inventors: William S. Graves, Marblehead, MA (US); Franz X. Kaertner, Newton, MA (US); David E. Moncton, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 705 days.

(21) Appl. No.: 13/105,114

(22) Filed: May 11, 2011

(65) Prior Publication Data

US 2012/0288065 A1 Nov. 15, 2012

(51) Int. Cl.
*H01J 35/02* (2006.01)
*H05G 2/00* (2006.01)
*B82Y 20/00* (2011.01)
*H05H 7/00* (2006.01)

(52) U.S. Cl.
CPC *H05G 2/00* (2013.01); *H01J 35/02* (2013.01); *H01J 2235/068* (2013.01); *H05G 2/008* (2013.01); *H05H 2007/005* (2013.01); *H05H 2007/007* (2013.01); *B82Y 20/00* (2013.01)
USPC .................... 378/119; 250/493.1; 315/111.81; 313/336

(58) Field of Classification Search
CPC ....... H01J 35/02; H01J 35/06; H01J 2235/06; H01J 2235/068; H05G 2/00; H05G 2/001; H05G 2/008

USPC ..................... 378/119, 121; 250/492.1, 492.2, 250/492.24, 493.1, 494.1, 503.1; 313/336; 315/5.14, 5.15, 500–507, 64, 69, 98, 315/324, 111.81

See application file for complete search history.

(56) References Cited

U.S. PATENT DOCUMENTS

| | | | | |
|---|---|---|---|---|
| 3,886,399 | A | * | 5/1975 | Symons .......................... 315/5 |
| 5,729,583 | A | * | 3/1998 | Tang et al. ..................... 378/122 |
| 7,391,850 | B2 | | 6/2008 | Kaertner et al. |
| 7,601,042 | B2 | * | 10/2009 | Srinivasan-Rao et al. ....... 445/23 |
| 7,801,277 | B2 | * | 9/2010 | Zou et al. ....................... 378/122 |
| 8,618,521 | B2 | * | 12/2013 | Loo et al. .................... 250/492.3 |
| 2007/0014392 | A1 | * | 1/2007 | Madey et al. ................. 378/119 |
| 2012/0288065 | A1 | * | 11/2012 | Graves et al. ................. 378/119 |

OTHER PUBLICATIONS

Cornacchia, M., et al., "Transverse to Longitudinal Emittance Exchange", *Physical Review Special Topics—Accelerators and Beams*, vol. 5, 084001-1 to 084001-9 (2002).

Kim, Kwang-Je, et al., "Transverse-Longitudinal Phase-Space Manipulations and Correlations", *CP821 Beam Cooling and Related Topics, International Workshop on Beam Cooling and Related Topics—COOL05*, 115-138 (2006).

* cited by examiner

*Primary Examiner* — Thomas R Artman
(74) *Attorney, Agent, or Firm* — Modern Times Legal; Robert J. Sayre (57) ABSTRACT

Coherent electronic current, which can be used to generate coherent radiation, is generated by first generating and transmitting an array of discrete electron beamlets from a nano-cathode array along a longitudinal axis. The array of electron beamlets is then focused to reduce the spacing that separates the electron beamlets. The transverse-axis spacing of the electron beamlets is then transferred to the longitudinal axis via an emittance exchange beamline, creating a periodically modulated distribution of coherent electronic current. The coherent electronic current can then be directed into a stream of photons to generate coherent radiation.

14 Claims, 4 Drawing Sheets

COMPACT COHERENT CURRENT AND RADIATION SOURCE

GOVERNMENT SUPPORT

This invention was made with government support under Grant No. DMR1042342 awarded by the National Science Foundation. The government has certain rights in this invention.

BACKGROUND

Existing methods of x-ray generation include (1) bremsstrahlung x-rays from a tube, (2) inverse Compton scattering in either a small linear accelerator (linac) [W. S. Graves, W. Brown, F. X. Kaertner, D. E. Moncton, Nucl. Instr. Meth. A 608, S103-S105 (2009)] or a small storage ring [M. Bech, O. Bunk, C. David, R. Ruth, J. Rifkin, R. Loewen, R. Feidenhans'l and F. Pfeiffer, J. Synchrotron Rad. 16, 43-47 (2009)], and (3) large scientific facilities such as synchrotrons and x-ray free electron lasers. Bremsstrahlung x-rays from a tube have low brightness, are not monochromatic except at fixed wavelengths, and are not coherent. While bremsstrahlung is the source of medical x-rays and is widely used for scientific work, it is many orders of magnitude less intense than the other sources. Inverse Compton scattering has demonstrated good performance but does not rely on coherent x-ray generation via a modulated beam and so it is orders of magnitude less efficient than the proposed method. Synchrotron and x-ray free electron laser facilities have the highest demonstrated x-ray performance but may cost in the range of $100 million to $1 billion and may have a size on the order of kilometers.

SUMMARY

An apparatus and method for generating coherent radiation are described herein. Various embodiments of the apparatus and method may include some or all of the elements, features and steps described below.

In embodiments of the apparatus and methods, coherent electronic current, which can be used to generate coherent radiation, is generated by first generating and transmitting an array of discrete electron beamlets from a nanocathode array along a longitudinal axis. The array of electron beamlets is then focused to reduce the spacing that separates the electron beamlets. The transverse-axis spacing of the electron beamlets is then transferred to the longitudinal axis via an emittance exchange beamline, creating a periodically modulated distribution of coherent electronic current. The coherent electronic current can then be directed into a stream of photons to generate coherent radiation.

The electron beam can have a coherent modulation of its electric current at length scale of angstroms to nanometers. The modulated electron beam can generate ultrabright coherent x-rays via inverse Compton scattering or undulator radiation. The electron beam can also be directly used for ultrafast electron diffraction studies.

The apparatus and methods can be used to (a) generate a 2D array of electron beamlets with sub-micron spacing between beamlets, (b) accelerate the array of beamlets, then focus, and rotate them with solenoidal magnetic fields to reduce the spacing of the projection of the beamlets in the transverse direction, (c) exchange the transverse and longitudinal phase space distributions via an emittance exchange beamline, creating a periodically modulated current distribution, and (d) generate coherent x-rays by matching the inverse Compton laser scattering resonance condition to the modulation period. Coherent x-rays may also be produced by matching the undulator resonance condition rather than inverse Compton scattering (ICS), which requires a higher energy electron beam.

X-ray beams produced by this source have the same broad suite of applications as large synchrotron or free-electron laser facilities, which include lithography, protein crystallography, ultrafast chemistry, and x-ray imaging. Additionally, due to its small size and high performance the Compact Coherent X-ray Source (CCXS) has applications in hospitals, industrial labs, and universities. It can be configured as a powerful source of soft x-rays for use in electronic chip manufacturing. The powerful x-ray beam is nearly monochromatic, tunable in wavelength, and contains substantial transverse coherence. These properties enable phase contrast imaging, a powerful medical technique enabling soft-tissue x-ray imaging with high resolution and low dose. One of its significant impacts is that it may reduce the dose received from medical x-rays by several orders of magnitude while generating better images.

In addition to the x-ray applications, the electrons may be used directly for electron diffraction to study the structure of materials. In particular, ultrashort pulses of electrons with duration at the single femtosecond level may be attainable. The periodic transverse and longitudinal electron density modulations may also open new studies of coherent imaging and studies of coherent excitations in materials.

The method described herein can generate coherent emission of x-rays due to a periodic modulation of the electron beam current at the x-ray wavelength. The effect of coherence is to both make the x-ray beam more powerful (higher x-ray flux per electron) and to cause the x-rays to occupy a smaller phase space volume (a brighter beam). Both of these attributes are important scientifically. Higher flux enables experiments on smaller samples, higher sensitivity to phenomena with a low cross-section, better spatial and temporal resolution, and faster data acquisition times. A brighter beam enables imaging methods based on phase interference, such as coherent Bragg diffraction or various phase contrast imaging methods.

An alternative method of producing a coherent modulation is the x-ray free-electron laser, whereby emitted x-rays act on the electron beam to cause a similar periodic modulation. This has been demonstrated at large facilities such as SLAC National Accelerator Laboratory, which requires 1 km of linac to accelerate the electrons to GeV energies. The proposed method reduces the electron energy, thus size and cost of the device, by several orders of magnitude. The physics of an free-electron-laser-like interaction for a beam undergoing inverse Compton scattering has been described [P. Sprangle, B. Hafizi, and J. R. Penano, Phys. Rev. ST-AB 12, 050702 (2009)], but the electron beam requirements are well beyond state-of-the-art and unlikely to be realized. The requirements for the CCXS electron beam are significantly eased from those of an FEL because it arrives at the interaction region already pre-bunched and does not depend on exponential growth of an instability.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms, "a," "an" and "the," are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

Figure 1:
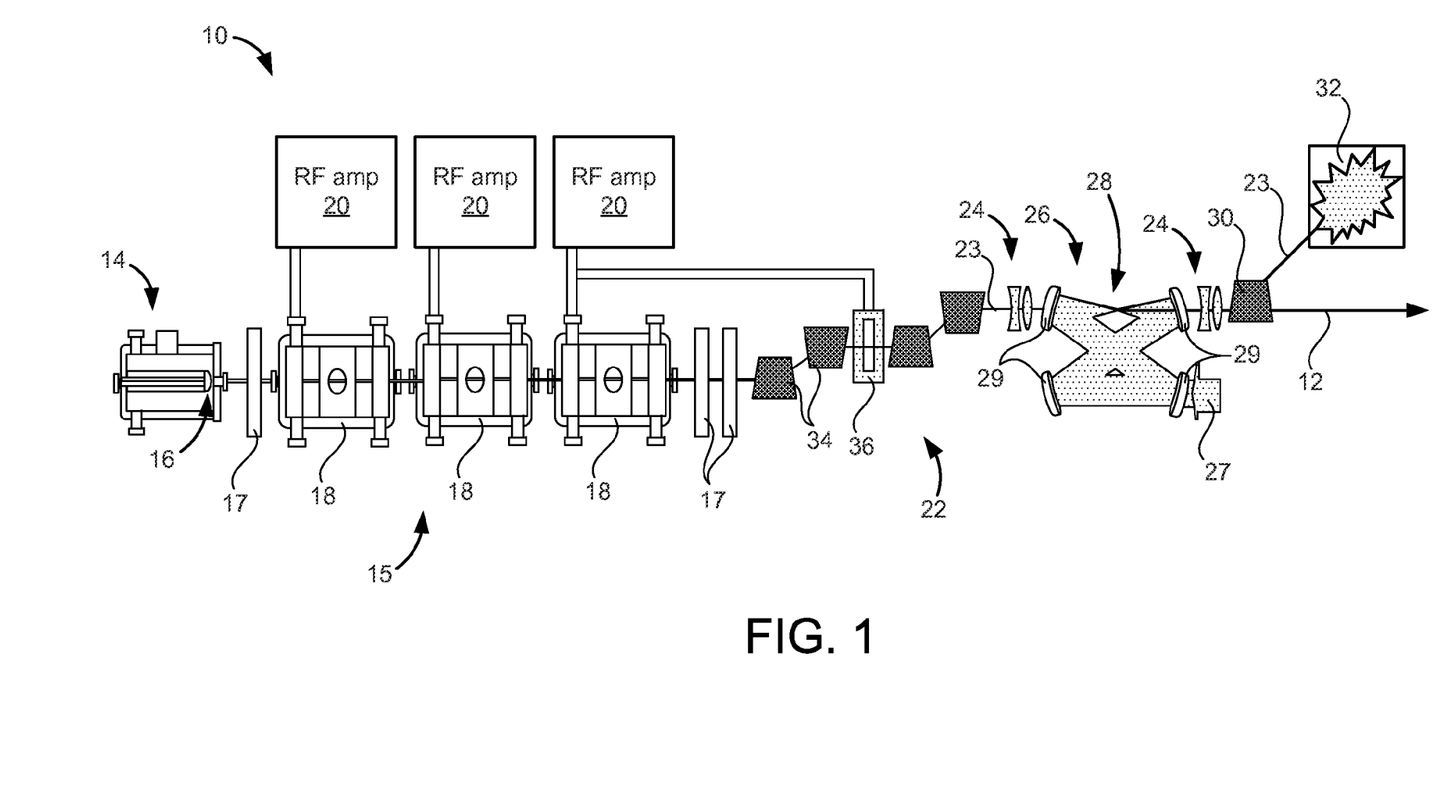
FIG. 1 shows a compact coherent radiation source including an injector, a superconducting radiofrequency linear accelerator, an emittance exchange beamline, a coherent enhancement cavity, and an electron beam dump.

An embodiment of a compact source 10 for generating coherent x-ray radiation 12 is shown in FIG. 1. The source 10 includes an injector 14 including a nanotip array cathode 16; solenoids 17; a superconducting radiofrequency linear accelerator 15 including three cavities 18, each of which is powered by a radiofrequency amplifier 20; an emittance exchange beamline 22 including dipole magnets 34 and a radiofrequency (RF) cavity 36; quadrupole focusing magnets 24; a coherent enhancement cavity 26 (with Q=1,000) where inverse Compton scattering 28 occurs and which is passive and maintained under vacuum; and an electron beam dump 32 for electrons deflected by an additional dipole magnet 30.

The enhancement cavity 26 can be supplied with a stream of photons 27 from a laser [e.g., a solid-state ytterbium-doped yttrium-aluminum-garnet (Yb:YAG) laser or a fiber laser, respectively available, e.g., from Trumph-Haas of Germany or from IPG-Photonics of Oxford, Mass., USA]; the photons can be coherently added in the enhancement cavity 26 and circulate in the closed optical path defined by the optical elements (e.g., mirrors) 29 that define the cavity 26, as described in U.S. Pat. No. 7,391,850 B2. The mirrors 29 are low-loss mirrors, which can be provided, e.g., by Newport Inc (Irvine, Calif., USA) or Advanced Thin Films (Longmont, Colo., USA). The optical pulses from the laser that fill the cavity 26 have a frequency matching that of the electrons entering the cavity 26, discussed below.

Enhancement cavities are further discussed, e.g., in v. Yanovsky, et al., "Frequency Doubling of 100-fs Pulses with 50% Efficiency by Use of a Resonant Enhancement Cavity," 19 Optics Letters 23, pp. 1952-1954 (1994); R. Jones, et al., "Femtosecond Pulse Amplification by Coherent Addition in a Passive Optical Cavity," 27 Optics Letters 20, pp. 1848-1850 (2002); B. Couilland, et al., "High Power CW Sum Frequency Generation Near 243 um using Two Intersecting Enhancement Cavities," Opt. Commun. 50, 127-129 (1984); E. O. Potma, et al., "Picosecond-Pulse Amplification with an External Passive Optical Cavity," Opt. Lett. 28, 1835-1837 (2003); Y. Vidne, et al., "Pulse Picking by Phase-Coherent Additive Pulse Generation in an External Cavity," Opt. Lett. 28, 2396-2398 (2003); and T. Hansch, et al., "Method and Device for Generating Phase-Coherent Light Pulses," U.S. Pat. No. 6,038,055.

A series of steps are employed to produce a coherently modulated electron beam. First, a two-dimensional array of electron beamlets is generated from a nanotip cathode array 16 (shown in FIGS. 2 and 3) in the injector 14. Each electron beamlet generated by a nanotip has an emittance near the limit set by the Heisenberg uncertainty principle. The beamlets are individually focused by microlenses to sub-nm size and at the same time accelerated in the injector 14. The injector 14 energy may range from tens of eV to several MeV.

After exiting the injector 14, the array of beamlets is rotated and focused by solenoid magnets 17. Considering the entire array as a two-dimensional (2D) crystal, when the beamlet array is rotated as a rigid body about its axis of travel (i.e., about the axis referred to as the longitudinal or z axis), harmonics of the original crystal spacing are projected onto the transverse planes. This harmonic spacing is also affected by the solenoidal focusing. As an example, the original spacing of the beamlets emitted from the nanocathode array 16 can be 100 nm or less. The solenoid magnets 17 focus the entire array of beamlets, demagnifying it by a factor of 30. The solenoidal field also rotates the array so that a harmonic (e.g., the 35th harmonic) is projected onto one of the transverse axes. The resulting beamlet spacing is then 0.1 nm in this example.

The rotated and focused beam is transported through an emittance exchange beamline 22, swapping the longitudinal and transverse phase space distributions, and resulting in an electron beam 23 with periodic current modulation of approximately 0.1 nm period. The emittance exchange beamline 22 converts the transverse structure of the beam into the longitudinal direction, and vice versa. The resulting periodic modulation of current is matched to the resonant wavelength of, e.g., inverse Compton scattering, resulting in coherent addition of the electric fields and greatly enhanced flux and brilliance of the x-ray beam over the ordinary case of incoherent x-ray generation. The individual steps that have been briefly outlined are described in more detail in the following paragraphs.

Nanotip Electron Emission and Beamlet Arrays

Figure 2:
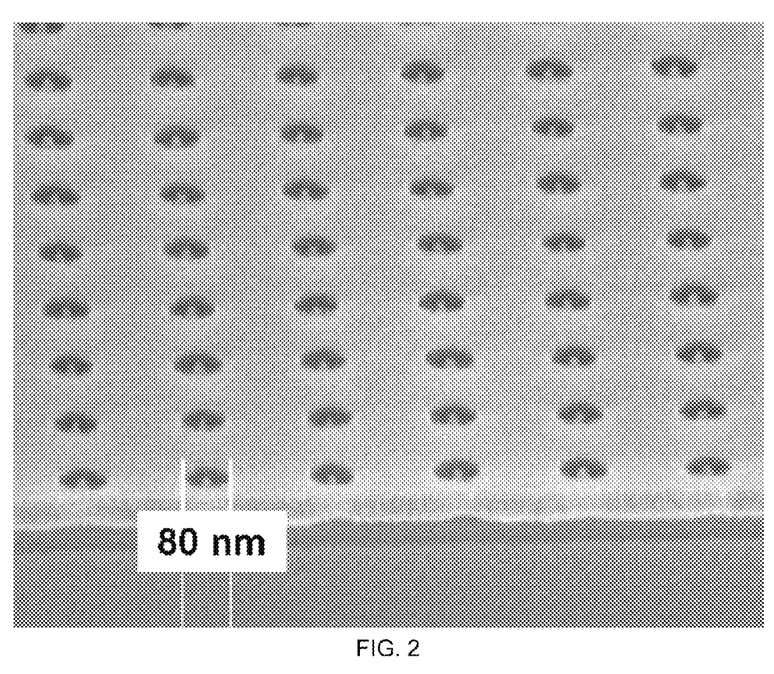
FIG. 2 is a magnified photographic image of a tip array with 200-nm spacing and 80-nm gate apertures.
Figure 3:
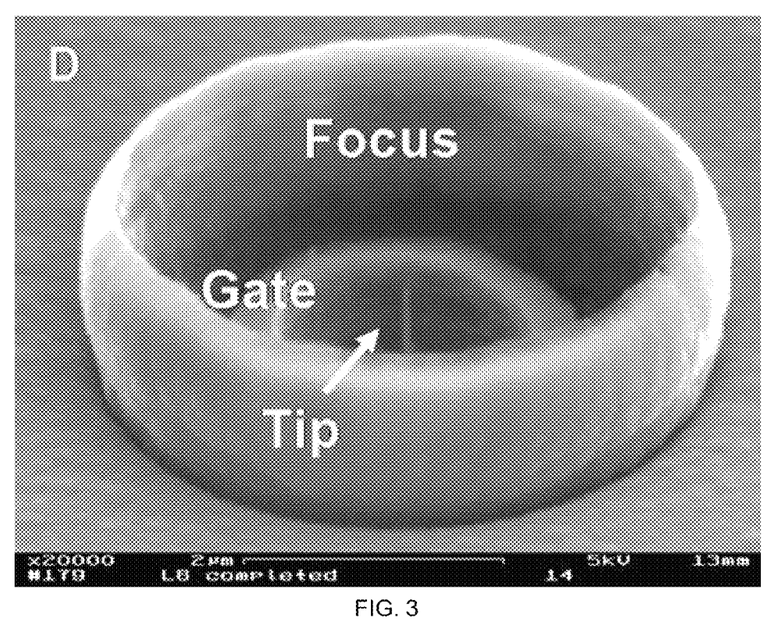
FIG. 3 shows a further magnified view of a double-gated tip, wherein the second gate provides focusing of each individual beamlet.

FIG. 2 shows a nanotip array in the form of a two dimensional grid of sharp electron emitters surrounded by focusing elements, which are shown in more detail in FIG. 3. The number of tips in the grid can be as high as, for example, $10^5$ to $10^6$, with 100- to 200-nanometer (nm) spacing between the tips. Such tips have been used in plasma display technology [L. Dvorson, M. Ding, A. I. Akinwande, IEEE Trans. Electron Dev. 48, 134-143 (2001)] and have begun to be considered for high energy electron beam applications [C. A. Brau, Nucl. Instr. Meth. A 407, 1-7 (1998); J. D. Jarvis, H. L. Andrews, C. A. Brau, B. K. Choi, J. Davidson, W.-P. Kang, Y.-M. Wong, J. Vac. Sci. Tech. B 27, 2264-2269; S. C. Leemann, A. Andersson, R. Ganter, V. Schlott, A. Streun, A. F. Wrulich, Proceedings EPAC06, 3499-3501, Edinburgh, Scotland (2006)] such as free electron lasers (FELs). The embodiment shown in FIG. 2 is a rectangular array, though improved performance may be achieved by a hexagonal structure, as shown in the modeled beamlet distribution of FIGS. 4 and 5.

Figure 4:
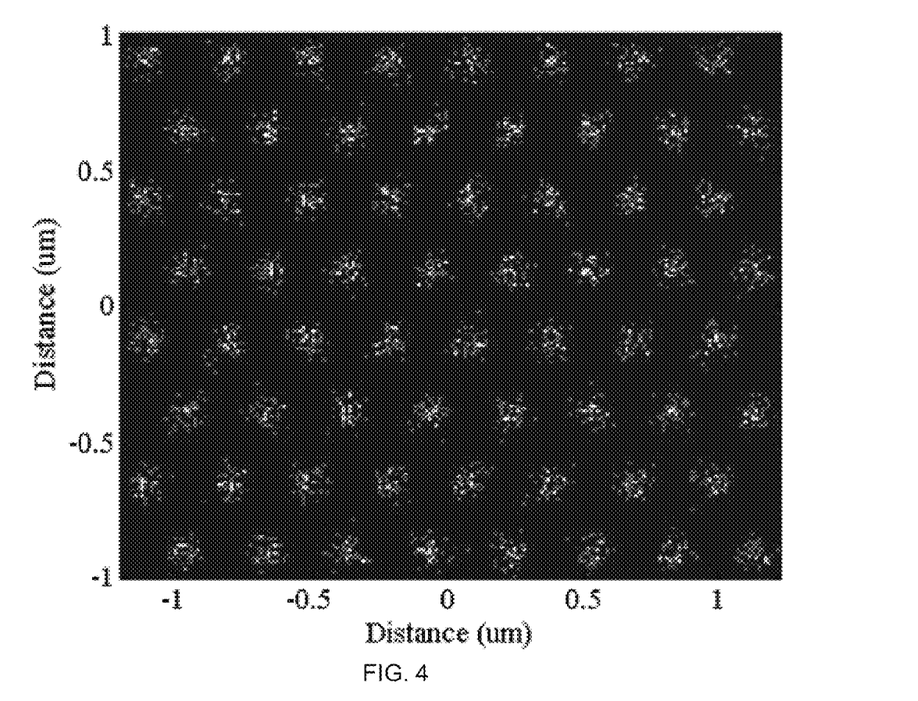
FIG. 4 shows modeled electron beamlets from an 8×8 nanotip array at a focus gate.
Figure 5:
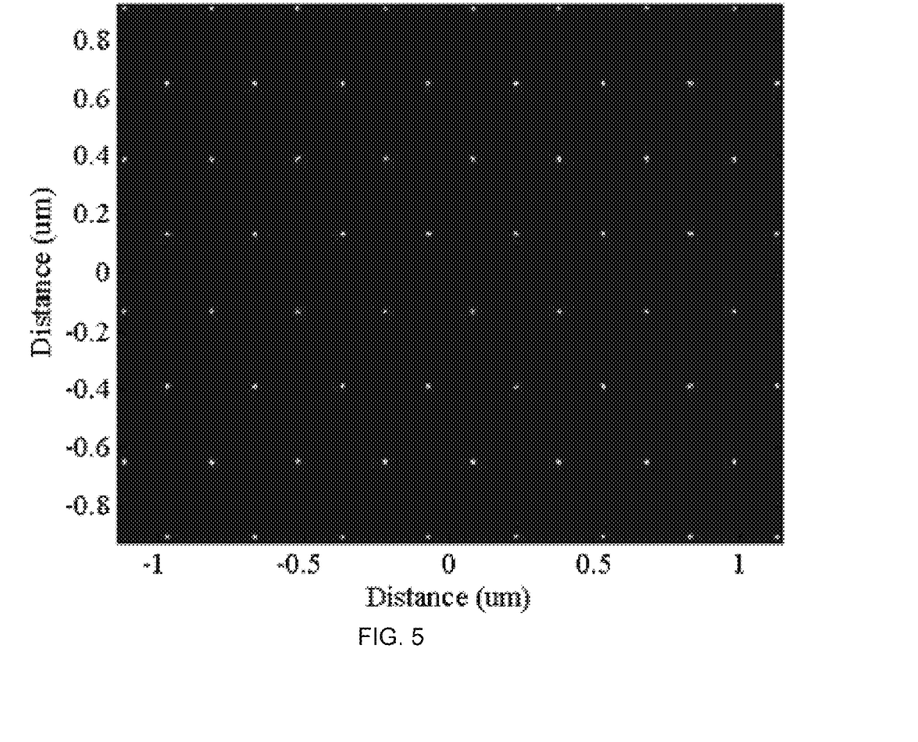
FIG. 5 shows the electron beamlets of FIG. 4 downstream after focusing, wherein the electron beamlets are focused by individual microlenses that do not change the spacing between beamlets.

The nanotips in the array 16 each use photo-assisted field transmission. A static electric field is applied to the tips by the first gate layer. This field is enhanced by the arrival of a laser pulse, which as a sub-picosecond switch to precisely time emission of the electrons. FIGS. 4 and 5 show modeled electron beamlets from a nanotip array 16. Beamlets from an 8×8 array are shown for clarity. The actual array can range from 100 to 1000 tips in each direction. FIG. 4 shows beamlets at the focus gate. FIG. 5 shows beamlets downstream after focusing. Individual microlenses do not change spacing between beamlets.

This geometry provides six-fold rotational symmetry and, therefore, a more uniform Coulomb restoring force between near-neighbor beamlets. Each tip emits electrons from an area with radius of ~1 nm and over a large angle of about 100 mrad due both to the curvature of the tip and also the spread in transverse momentum required by the uncertainty principle. Despite the large angle of emission, the electron beam emittance (product of beam size and angle) is still much smaller than conventional photo-excited or thermionic cathodes due to the very small emission area. A small emittance is a prerequisite for beams intended to drive next generation light sources, whether FEL, energy recovery linac (ERL), or compact ICS-based source, due to the high phase-space density required to produce bright x-ray beams. The normalized emittance of a single tip is slightly larger than the uncertainty limit, with a numerically modeled value of $3 \times 10^{-13}$ m-rad. Many tips are excited in order to produce a substantial number of electrons. Each tip is limited to a peak current of ~10 uA, therefore approximately $10^5$ tips are required to generate a peak current near 1 A, which can be accomplished by, e.g., a 300×300 tip array. The current can be gated through laser enhanced field emission [H. Himawaki, Y. Suzuki, K. Sagae, Y. Neo, H. Mimura, J. Vac. Sci. Tech. B 23, 687-690 (2005)] so that short pulses are generated. In that case a 1 ps laser pulse would produce approximately 1 pC of charge.

TABLE 1

Electron beamlet parameters at different locations:

| Location | Mean kinetic energy (eV) | β | βγ | Beamlet size (nm) | Opening angle (micro-rad) |
|---|---|---|---|---|---|
| Cathode | 1 | $2 \times 10^{-3}$ | $2 \times 10^{-3}$ | 0.7 | $140 \times 10^3$ |
| Focus gate | 10 | $6 \times 10^{-3}$ | $6 \times 10^{-3}$ | 50 | 650 |
| Injector exit | $5 \times 10^6$ | 0.996 | 10.7 | 1 | 18 |
| Linac exit | $25 \times 10^6$ | 1.000 | 49.9 | 1 | 4 |

Acceleration, Focusing, and Magnetic Rotation

To generate x-rays, the electrons are accelerated to relativistic energy. This acceleration can be achieved in an injector 14 (as shown in FIG. 1) followed by a fixed-frequency superconducting linear accelerator (linac) 15. After passing through the focus gate, the beamlets are accelerated in the injector 14 to reach energy of, e.g., 5 MeV at the exit of the injector 14.

The linac 15, in this embodiment, is formed of three niobium RF cavities 18, wherein the niobium is cooled below its superconducting temperature (e.g., to an operating temperature of 2K). More or fewer cavities 18 can be used, and the linac 15 and a surrounding cryostat can be obtained, e.g., from Accel Instrument GmbH (of Bergisch Gladbach, Germany). The RF amplifiers 20 that power the cavities 18 of the linear accelerator 15 can be in the form of inductive output tubes (IOTs), which can serve as compact and efficient RF sources.

Although each beamlet is focused to a tight spot, the distance between beamlet centers remains approximately constant because they are focused by individual lenses at the focus gate. Recall that the opening angle of each beamlet scales as $1/\beta\gamma$ and the emittance of each beamlet is extremely small so that the beamlets are highly collimated even at a tight focus. A summary of beam sizes and opening angles at different points in the accelerator is given in Table 1, above.

At the exit of the injector 14, an external magnetic field is applied by a solenoid 17 to the entire array of beamlets to change both the individual beamlet size and also the spacing between beamlets. In addition to focusing the beam, the solenoid 17 rotates the beam as a rigid body about its axis. This property can be used to increase the effective density of points in one transverse direction by rotating the beamlet array so that a harmonic of the array spacing is projected onto the x-axis.

The solenoid field in the source 10 is conveniently sourced from multiple solenoids 17 with opposite polarity. This arrangement allows independent control of the focusing strength, which does not depend on field direction, and beamlet array rotation. For example, at equal and opposite strength, no net rotation occurs although focusing is produced. The degree of rotation and focusing are determined by the ratio of the fields and the integrated field strengths, respectively. For the 300×300 example array, an angle of 1/15 radian will pick up the $20^{th}$ harmonic in the x-direction, reducing the spacing between peaks from 50 nm to 2.5 nm. The beam is also focused so that the spacing becomes smaller as it propagates, with a goal of sub-nm beamlet size to generate hard x-rays after transformation of the structure into the longitudinal plane.

The beam is accelerated, e.g., to 25 MeV, in the superconducting linear accelerator 15 while the array of beamlets is being reduced in size due to the solenoid focus. At the exit of the accelerator 15, the individual beamlet size is less than 1 nm, while the entire array size also contracts due to the focus. At this point, the array of beamlets has been prepared to enter the emittance exchange beamline 22, described below. The x-projection of the periodic structure with sub-nm spacing will be exchanged into the longitudinal z-direction (i.e., the direction traveled by the beamlets) to produce coherent radiation.

Emittance Exchange Beamline

Figure 6:
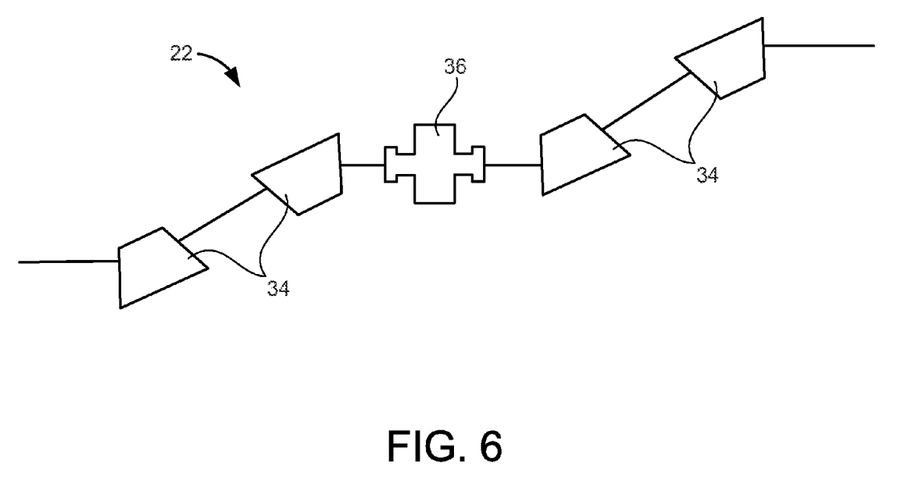
FIG. 6 shows an emittance exchange beamline including two dogleg bending lines separated by a deflecting radiofrequency cavity. Each dogleg includes two dipole magnets of opposite polarity separated by a drift space.

The emittance exchange beamline 22 has unusual properties. Electron beam transport can be described as a set of linear equations represented by the following matrix equation:

$$\sigma_1 = R\sigma_0 \tilde{R}$$

where the σ matrix elements consist of the electron beam's second moments, the R matrix is a linear transport matrix representing, e.g., drift space, bending, focusing, and acceleration, and $\tilde{R}$ is its transpose. The R matrix must satisfy several constraints [D. A. Edwards and M. J. Syphers, An Introduction to the Physics of High Energy Accelerators (New York, Wiley-Interscience, 1993)] to be physically realizable. In general, the σ and R matrices are 6×6 arrays representing the beam's six-dimensional (6D) phase space. For our purposes, we will ignore the γ-dimension and consider four-dimensional (4D) matrices representing the x and z directions that are to be exchanged, where the z (longitudinal) direction parallels the direction traveled by the beamlets, and the x (transverse) direction is orthogonal to the z direction. The R matrix then has the following form:

$$R = \begin{pmatrix} A & B \\ C & D \end{pmatrix}$$

where A, B, C, D are 2×2 submatrices. For typical beam transport and acceleration elements, there is no coupling between transverse and longitudinal planes so that B=C=0 while the elements of A and D are nonzero. However, the emittance exchange beamline is designed for complete exchange of x and z phase space dimensions, and so the elements of B and C are nonzero while A=D=0 [M. Cornacchia, P. Emma, Phys Rev ST-AB 5, 084001 (2002)].

An emittance exchange beamline 22 that achieves this result [K.-J. Kim, A. Sessler, Proc. Inter. Workshop Beam Cooling—COOL05, 115-138, Galena, Ill. (2005)] is shown in FIG. 6. The emittance exchange beamline 22 includes two identical dogleg transport lines, including a pair of dipole magnets 34 separated by a $TM_{01}$ deflecting radiofrequency (RF) cavity 36, which is also powered by one of the radiofrequency (RF) amplifiers 20, as shown in FIG. 1. The dogleg lines have equal bends in opposite directions separated by a drift space. The RF cavity 36 is driven in the dipole $TM_{01}$ mode so that on-axis electrons are not accelerated and off-axis electrons are deflected in opposite directions by the cavity B-field.

The emittance exchange R matrix performs a complete exchange of phase space properties between two orthogonal planes, in this case, the x and z directions. This means that the periodicity along the x-axis of the beamlet array is transferred to the longitudinal dimension, while the smooth z-distribution of electron current is transferred to the transverse x-dimension, and similarly the upstream transverse momentum spread, manifest as the beam's opening angle entering the emittance exchange line, becomes the longitudinal energy spread, and vice versa.

The B and C matrices completely exchange transverse and longitudinal coordinates, but the non-zero off-diagonal terms of each 2×2 submatrix result in strong correlations in the output beam between x and $p_x$ transversely, and z and $p_z$ longitudinally, that are cancelled by appropriate correlations in the input distribution.

Coherent X-Ray Radiation

After exiting the emittance exchange beamline 22, the electron beam 23 is focused with magnets 24 and directed into the coherent enhancement cavity 26, where the electrons interact with the circulating photons to emit coherent radiation. The electron stream can either be directed around the mirrors 29 or through small orifices (e.g., laser-drilled holes) in the mirrors 29. After interacting with the photons to produce inverse Compton Scattering, the electrons exit the cavity 26 (e.g., passing through an orifice in a mirror 29), are further focused by a second set of magnets 24 and are then deflected by a dipole magnet 30 into an electron beam dump 32 to separate the electrons 23 from the generated radiation 12.

TABLE 2

Estimated performance at 12 keV photon energy assuming 10% coherent bunching:

| Parameter | Coherent ICS | Incoherent ICS | Units |
|---|---|---|---|
| Photons per pulse | $10^7$ | $10^6$ | |
| Average flux (.1% BW) | $10^{15}$ | $10^{11}$ | photons/s |
| Average flux (total BW) | $10^{15}$ | $10^{14}$ | photons/s |
| Bandwidth | 0.02 | 25 | % |
| Average brightness | $2 \times 10^{20}$ | $6 \times 10^{14}$ | photons/(s .1% mm$^2$mrad$^2$) |
| Peak brightness | $8 \times 10^{26}$ | $2 \times 10^{19}$ | photons/(s .1% mm$^2$mrad$^2$) |
| Coherent fraction | 2 | 0.2 | % |
| Opening angle | 0.3 | 3 | mrad |
| Source size | 3 | 3 | um |
| Pulse length | 2 | 100 | fs |
| Charge per pulse | 1 | 10 | pC |
| Repetition rate | 100 | 100 | MHz |
| Average current | 0.1 | 1 | mA |

Table 2, above, summarizes the estimated coherent inverse Compton scattering (ICS) properties assuming a 10% modulation depth at 0.1 nm period, and compares those properties to a possible high performance incoherent ICS source [W. S. Graves, W. Brown, F. X. Kaertner, D. E. Moncton, Nucl. Instr. Meth. A 608, S103-S105 (2009)]. The estimated photon flux is limited by extracting ~1% of the stored electron beam energy, which at 25 MeV corresponds to about 20 emitted 12 keV photons per electron. Furthermore, we assume that not all electrons will be perfectly bunched so that just 10% contribute to the coherent signal. For a bunch with 1 pC charge, this amounts to $10^7$ photons per pulse, a factor of 10 higher than the incoherent ICS even though the average current is a factor of 10 lower. The coherent process not only generates more photons, but also emits them into a much smaller phase space volume, resulting in a correspondingly larger brilliance.

The beam has significant transverse coherence, but unlike an FEL, coherent ICS does not excite a single exponentially growing mode so will not have 100% transverse coherence. The coherent fraction is estimated by comparing the electron beam emittance to the phase space area of a coherent x-ray beam=$\lambda/4\pi$. The beam's geometric emittance is $3\times10^{-10}$ m-rad while the coherent mode area is $8\times10^{-12}$ m-rad so that about 40 modes are excited, for a coherent fraction of 2%, an order of magnitude better than today's major storage rings. Similar calculations for 13.5 nm light used in lithography chip manufacture indicate an output power of tens to hundreds of watts of tunable, collimated narrow-band extreme ultra-violet (EUV) radiation.

Coherent ICS has the potential to outperform even self-amplified-spontaneous-emission free-electron lasers (SASE FELs) in the longitudinal dimension due to the high level of phase coherence. A SASE FEL starts from noise that is amplified by the FEL process. Without seeding, it retains a wide bandwidth that is much larger than the transform limit. Coherent ICS depends on super-radiant emission where the electrons radiate in phase because they are pre-arranged in a periodic train, so that the output beam is phase coherent and nearly transform-limited. The bandwidth is estimated by assuming that 300×300 nanotips are excited and the $20^{th}$ harmonic rotated into the longitudinal plane via emittance exchange. This results in a train of 6,000 microbunches with angstrom (e.g., 1-10 angstrom) spacing. ICS scattering then results in an x-ray output bandwidth of $1/6000=2\times10^{-4}$. To produce such a narrow bandwidth while losing 1% kinetic energy requires that the colliding laser pulse have a linear energy chirp to match the energy loss so keeping the resonant wavelength constant. Note that a 6000 period x-ray pulse is just 2 fs in duration.

Attosecond Electron Microscope

Another application of the techniques described above is to construct an electron injector capable of producing attosecond pulses for ultrafast electron diffraction studies. In this case, rather than using a two-dimensional (2D) nanotip array, a one-dimensional (1D) array is used. The beamlets are generated, focused by individual beamlet lenses, and accelerated to 100 keV in the same manner as described above. However, rather than continue to accelerate the beamlets, the beamlets are then transported through the emittance exchange beamline, which may be just centimeters in length due to the low electron energy. Emittance exchange is performed with the transverse dimension that is a single beamlet wide. This beamlet dimension has been focused to <10 nm size prior to exchange, resulting in <10 nm bunch length after exchange. This corresponds to a 30 attosecond bunch length. Using the properties of the previously described nanotip array, a single row generates approximately $2\times10^4$ electrons, which is adequate for microscopy.

Exemplary Commercial Applications

Coherent x-rays are useful for medical imaging, where they may have three impacts: enable phase-contrast techniques that (1) reduce the patient dose by orders of magnitude compared to traditional radiography, (2) enable sensitive imaging of soft tissue, and (3) improve the spatial resolution over conventional radiography.

There are large markets for industrial, scientific, and military x-rays including EUV lithography, x-ray microscopy, protein crystallography, and studies of ultrafast phenomena. The proposed method enables the proliferation of high performance x-rays similar to those produced by large synchrotron facilities and FELs into labs where they are not currently available.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for generating coherent electronic current comprising:
    generating and transmitting an array of discrete electron beamlets along a longitudinal axis with spacing separating the electron beamlets across at least one transverse axis;
    focusing the array of electron beamlets to reduce the spacing that separates the electron beamlets; and
    transferring the transverse-axis spacing of the electron beamlets to the longitudinal axis via an emittance exchange beamline, creating a periodically modulated distribution of coherent electronic current.

2. The method of claim 1, further comprising directing the periodically modulated distribution of electronic current into a stream of photons to generate coherent radiation.

3. The method of claim 2, wherein the stream of photons have a periodic distribution matching that of the electronic current.

4. The method of claim 2, wherein the coherent radiation has a wavelength of less than 30 nm.

5. The method of claim 2, wherein the coherent radiation has a wavelength of 0.2 nm or less.

6. The method of claim 1, wherein the array of electron beamlets extends across two transverse axes.

7. The method of claim 1, wherein the array of electron beamlets is generated by a nanocathode array.

8. The method of claim 7, wherein spacing between nanocathodes in the nanocathode array is no greater than 200 nm.

9. The method of claim 7, wherein the nanocathode array includes at least 10,000 nanocathodes.

10. The method of claim 1, further comprising accelerating the array of electron beamlets.

11. The method of claim 1, further comprising projecting a harmonic of the array of beamlets onto the transverse axis by rotating the array of electron beamlets about the longitudinal axis.

12. The method of claim 11, wherein focusing and rotating the array of electron beamlets reduces the spacing between the electron beamlets to no greater than 1 nm.

13. An apparatus for generating coherent electronic current comprising:
   a nanocathode array configured to emit an array of electron beamlets along a longitudinal axis;
   microlenses positioned and configured to focus the array of electron beamlets so as to reduce spacing between the beamlets;
   an accelerator positioned and configured to receive and accelerate the array of electron beamlets along the longitudinal axis;
   a solenoid magnet positioned and configured to further focus the array of electron beamlets and to rotate the array of electron beamlets about the longitudinal axis; and
   an emittance exchange beamline positioned and configured to convert a transverses structure of the array of electron beamlets to a longitudinal structure along the longitudinal axis to produce a periodically modulated distribution of coherent electronic current.

14. The apparatus of claim 13, further comprising:
   an enhancement cavity including optical elements that define an optical path in the enhancement cavity, wherein the enhancement cavity is positioned to receive the periodically modulated distribution of coherent electronic current; and
   a laser positioned and configured to generate photons and to direct the photons into the enhancement cavity for circulation along the optical path in the enhancement cavity where the photons can interact with the periodically modulated distribution of coherent electronic current to generate radiation.

* * * * *